(12) United States Patent
Riemens et al.

(10) Patent No.: US 9,691,160 B2
(45) Date of Patent: Jun. 27, 2017

(54) DEVICE AND METHOD FOR MOTION ESTIMATION AND COMPENSATION

(71) Applicant: Entropic Communications, LLC, Carlsbad, CA (US)

(72) Inventors: Abraham Karel Riemens, Eersel (NL); Marcel Melters, Eindhoven (NL)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 14/797,249

(22) Filed: Jul. 13, 2015

(65) Prior Publication Data

US 2015/0325001 A1 Nov. 12, 2015

Related U.S. Application Data

(63) Continuation of application No. 13/123,858, filed as application No. PCT/IB2009/054633 on Oct. 21, 2009, now Pat. No. 9,100,535.

(30) Foreign Application Priority Data

Oct. 22, 2008 (EP) .................................. 08167308

(51) Int. Cl.
| | | |
|---|---|---|
| *G06K 9/52* | (2006.01) | |
| *H04N 5/14* | (2006.01) | |
| *H04N 7/01* | (2006.01) | |
| *G06T 7/20* | (2017.01) | |
| *G06F 17/30* | (2006.01) | |

(52) U.S. Cl.
CPC .......... *G06T 7/20* (2013.01); *G06F 17/30271* (2013.01); *G06K 9/52* (2013.01); *H04N 5/144* (2013.01); *H04N 7/014* (2013.01)

(58) Field of Classification Search
None
See application file for complete search history.

(56) References Cited

U.S. PATENT DOCUMENTS

| | | | |
|---|---|---|---|
| 6,240,211 B1 | 5/2001 | Mancuso et al. | |
| 7,693,218 B2 * | 4/2010 | Hubrich ................. | H04N 5/145 375/240.16 |

(Continued)

OTHER PUBLICATIONS

De Haan et al., "True-Motion Estimation with 3-D Recursive Search Block Matching", IEEE Transactions on Circuits and Systems for Video Technology, IEEE Service Center, Piscataway, NJ, US, vol. 3, No. 5, Oct. 1993, pp. 368-379.

(Continued)

*Primary Examiner* — Reza Aghevli
(74) *Attorney, Agent, or Firm* — McAndrews, Held & Malloy, Ltd.

(57) ABSTRACT

A device for motion estimation in video image data is provided. The device comprises a motion estimation unit (11, 21) for estimating a current motion vector for an area of a current image by determining a set of temporal and/or spatial candidate motion vectors and selecting a best motion vector from the set of candidate motion vectors. The motion estimation unit (11, 21) is further adapted for substantially doubling one or more of the candidate motion vectors and for including the one or more substantially doubled candidate motion vectors in the set of candidate motion vectors.

17 Claims, 3 Drawing Sheets

(56) References Cited

U.S. PATENT DOCUMENTS

| | | | |
|---|---|---|---|
| 2002/0126760 A1* | 9/2002 | Schutten | H04N 7/014 375/240.16 |
| 2003/0026343 A1 | 2/2003 | Kim et al. | |
| 2005/0063467 A1 | 3/2005 | Hekstra et al. | |
| 2005/0157792 A1* | 7/2005 | Baba | G06T 3/4007 375/240.16 |
| 2005/0243929 A1 | 11/2005 | Hubrich et al. | |
| 2005/0286636 A1* | 12/2005 | Nicolas | H04N 5/145 375/240.16 |
| 2007/0133685 A1 | 6/2007 | Seong et al. | |
| 2007/0147506 A1 | 6/2007 | Kwon et al. | |
| 2007/0217511 A1* | 9/2007 | Li | H04N 19/56 375/240.16 |
| 2007/0217517 A1* | 9/2007 | Heyward | H04N 5/145 375/240.21 |
| 2007/0237226 A1 | 10/2007 | Regunathan et al. | |
| 2007/0237232 A1* | 10/2007 | Chang | H04N 19/192 375/240.16 |
| 2008/0043848 A1* | 2/2008 | Kuhn | G06F 17/30811 375/240.16 |
| 2008/0192986 A1* | 8/2008 | Living | G06T 7/2013 382/107 |
| 2009/0278991 A1* | 11/2009 | Freiburg | H04N 7/014 348/699 |

OTHER PUBLICATIONS

De Haan et al., "An Efficient True-Motion Estimator Using Candidate Vectors from a Parametic Motion Model", IEEE Transactions on Circuits and Systems for Video Technology, IEEE Service Center, Piscataway, NJ, US, vol. 8, No. 1, Feb. 1998.

* cited by examiner

DEVICE AND METHOD FOR MOTION ESTIMATION AND COMPENSATION

This is a continuation of U.S. patent application Ser. No. 13/123,858, filed May 6, 2011, which is a 35 U.S.C. 371 national stage patent application of International Appl. No. PCT/IB2009/054633, filed Oct. 21, 2009, which claims priority from European patent application 08167308.9, filed Oct. 22, 2008. The above-referenced patent applications are all hereby incorporated by reference in their entirety.

FIELD OF THE INVENTION

The present invention relates to a device and a method for motion estimation and compensation in video image data. The invention further relates to a computer program product.

BACKGROUND OF THE INVENTION

Many video processing techniques apply temporal processing, for example, for temporal predictive coding, temporal noise reduction, de-interlacing, or frame rate conversion. In all these cases, it is advantageous that the temporal information for an area of a current image, for example, a block of pixels in a previous image, used in the processing of the current image, results from the same object, rather than from the same location in the previous image. Hence, it is advantageous to compensate for the relative frame-to-frame motion of the objects in the scene. This so-called motion compensation requires that motion information in video image data can be estimated using a process called motion estimation.

Many motion estimation algorithms used in commercial applications, especially in the consumer domain, are based on a so-called recursive search strategy, where a current motion vector for an area of a current image, for example, for a block of pixels, is determined from only a limited number of previously estimated motion vectors and, optionally, additional (pseudo random) update vectors. This is usually done by: a) calculating a set of temporal and/or spatial candidate motion vectors from the limited number of previously estimated motion vectors and, optionally, the additional (pseudo random) update vectors, wherein spatial candidate motion vectors are based on previously estimated motion vectors in the current image and wherein temporal motion vectors are based on previously estimated motion vectors in a previous image; b) calculating a match error, for example, a block matching error, for respective candidate motion vectors, and; c) selecting the current motion vector from the set of temporal and/or spatial candidate motion vectors by comparing the match errors of the respective candidate motion vectors. One well-known example of such a recursive algorithm is the 3-D recursive search block matching described by G. de Haan et al. in "True-Motion Estimation with 3-D Recursive Search Block Matching", IEEE Trans. on Circuits and Systems for Video Technology, Vol. 3, No. 5, October 1993, pages 368-379.

Due to their recursive structure, one of the main considerations in the design and application of these motion estimation algorithms is the convergence and accuracy of the calculated motion vector field. This is usually handled by a trade-off between the composition of the set of candidate vectors (for example, the number of candidate vectors for a block of pixels) and the statistical distribution of the update vectors. One can typically increase the speed of the convergence by applying more candidate vectors, though this comes at the expense of a higher computational load. On the other hand, a higher accuracy of the motion vector field can be achieved by using small update vectors, but this also slows down the convergence speed. With many of today's temporally recursive motion estimation algorithms, a good convergence can be obtained after processing a few images, typically in the range of 3 to 5.

In order to provide a good and fast convergence of the motion vector field, motion estimation algorithms that use a temporal recursive structure basically require that the temporal distance between consecutive input images is largely equidistant so that the relative frame-to-frame motion of objects in the scene (caused either by a movement of the objects or by a movement of the camera) is as far as possible constant. However, in some video processing applications, this requirement is not necessarily fulfilled. For example, a wireless video transmission to a mobile device might use a frame rate of 15 Hz, that is, the number of input images transmitted to and processed by the mobile device each second is 15. When the video is derived from a movie source that was originally recorded with 24 images per second, the necessary adaptation of the frame rate might be accomplished by simply skipping individual movie images at the distribution side. The missing images can result in irregular motion patterns in the input image data received by the mobile device. When applying a temporally recursive motion estimation in the mobile device, this can result in a bad convergence of the motion estimation algorithm, resulting in unreliable and inaccurate motion vectors. The application of these motion vectors by further video processing techniques may then result in visible artifacts in the processed images.

SUMMARY OF THE INVENTION

It is an object of the present invention to provide a motion estimation and compensation device that is adapted for handling missing input images in video image data. It is a further object of the present invention to provide a corresponding motion estimation and compensation method and a computer program.

This is solved by a device according to claim 1 and a method according to claim 13.

Therefore, a device for motion estimation in video image data is provided. The device comprises a motion estimation unit for estimating a current motion vector for an area of a current image by determining a set of temporal and/or spatial candidate motion vectors and selecting a best motion vector from the set of candidate motion vectors. The motion estimation unit is further adapted for substantially doubling one or more of the candidate motion vectors and for including the one or more substantially doubled candidate motion vectors in the set of candidate motion vectors.

In this description and in the subsequent claims, the term "substantially doubling" may particularly denote the multiplication of each of the individual components of a motion vector by a factor in the range between 1.7 and 2.3, more particularly by a factor in the range between 1.9 and 2.1, more particularly by a factor of 2.0.

The invention relates to the observation that when individual input images are missing in video image data, the length of the motion vectors between successive images is suddenly doubled, resulting in bad convergence when applying temporally recursive motion estimation. By including one or more substantially doubled candidate motion vectors in the set of candidate motion vectors, a good convergence of the motion estimation can be achieved even in the case of missing input images. This preserves the quality of the motion vector field, and, thus, the quality of the output images of the video processing techniques that apply the motion vectors. Furthermore, this solution might be obtained at minimal additional load and with basically no additional image access bandwidth.

According to an aspect of the invention, the device further comprises a motion vector storage unit adapted for storing the current motion vector. In case that one of the one or more substantially doubled candidate motion vectors is selected as the current motion vector, the motion estimation unit nonetheless stores the associated regular candidate motion vector as the current motion vector in the motion vector storage unit. This provides a simple way to incorporate substantially doubled candidate motion vectors in the motion estimation.

According to an aspect of the invention, the device further comprises a temporal distance detection unit adapted for detecting a doubling of the temporal distance between the current image and the previous image. This information can be utilized when using the stored current motion vector in motion compensation.

According to an aspect of the invention, the temporal distance detection unit is adapted for detecting a doubling of the temporal distance between the current image and the previous image by analyzing the number of substantially doubled candidate motion vectors that are selected as the current motion vector for respective areas of the current image. By doing so, a doubling of the temporal distance between the current image and the previous image can be detected in a simple and efficient way.

According to a further aspect of the invention, the temporal distance detection unit is further adapted for keeping track of the temporal distance between successive images and for deriving a prediction of the temporal distance between the current image and the previous image. By using this information, the motion estimation can be optimally tuned to the characteristics (in terms of missing images) of the input image data.

According to an aspect of the invention, the motion estimation unit is further adapted for including the one or more substantially doubled candidate motion vectors in the set of candidate motion vectors in dependence of the predicted temporal distance between the current image and the previous image. By doing so, the computational effort required for the motion estimation can be reduced without sacrificing the convergence of the motion vector field.

According to an aspect of the invention, the motion estimation unit is further adapted for substantially halving one or more candidate vectors and for including the one or more substantially halved candidate motion vectors in the set of candidate motion vectors.

In this description and in the subsequent claims, the term "substantially halving" may particularly denote the multiplication of each of the individual components of a motion vector by a factor in the range between 0.35 and 0.65, more particularly by a factor in the range between 0.45 and 0.55, more particularly by a factor of 0.5.

By including one or more substantially halved candidate motion vectors in the set of candidate motion vectors, the motion estimation can easily switch from regular candidate motion vectors to substantially doubled candidate motion vectors ("doubling") and from substantially doubled candidate motion vectors back to regular candidate motion vectors ("halving").

According to an aspect of the invention, the device further comprises a motion vector storage unit adapted for storing the current motion vector. In case that one of the one or more substantially doubled or halved candidate motion vectors is selected as the current motion vector, the motion estimation unit stores the substantially doubled or halved candidate motion vector as the current motion vector in the motion vector storage unit. By doing so, a substantially doubled or halved candidate motion vector selected as the current motion vector can easily propagate over the current image as a spatial candidate motion vector. Due to this property, potentially only one or very few substantially doubled or halved candidate motion vectors need to be calculated. Furthermore, a substantially doubled or halved candidate motion vector selected as the current motion vector can automatically be applied in motion compensation without requiring any additional processing steps.

According to a further aspect of the invention, the device comprises a temporal distance detection unit adapted for detecting a doubling or halving of the temporal distance between the current image and the previous image.

According to an aspect of the invention, the temporal distance detection unit is adapted for detecting a doubling or halving of the temporal distance between the current image and the previous image by comparing the lengths of current motion vectors for respective areas of the current image with the lengths of previous motion vectors for related areas of the previous image. Herein, the term "related area" may relate to the same location in the previous image or, alternatively, may relate to a location in the previous image that is shifted by the current motion vector with respect to a respective area of the current image. By doing so, a doubling or halving of the temporal distance between the current image and the previous image can be detected in a simple and efficient way.

According to a further aspect of the invention, the temporal distance detection unit is further adapted for keeping track of the temporal distance between successive images and for deriving a prediction of the temporal distance between the current image and the previous image. By using this information, the motion estimation can be optimally tuned to the characteristics (in terms of missing images) of the input image data.

According to an aspect of the invention, the motion estimation unit is further adapted for including the one or more substantially doubled or halved candidate motion vectors in the set of candidate motion vectors in dependence of the predicted temporal distance between the current image and the previous image. By doing so, the computational effort required for the motion estimation can be reduced without sacrificing the convergence of the motion vector field.

The invention also relates to a method for motion estimation in video image data. The method comprises the step of estimating a current motion vector for an area of a current image by determining a set of temporal and/or spatial candidate motion vectors and selecting a best motion vector from the set of candidate motion vectors. The method substantially doubles one or more of the candidate motion vectors and includes the one or more substantially doubled candidate motion vectors in the set of candidate motion vectors.

The invention also relates to a computer program for motion estimation in video image data, wherein the computer program comprises program code for causing a device for motion estimation as defined in claim 1 to carry out the steps of the method for motion estimation as defined in claim 13, when the computer program is run on a computer controlling the device for motion estimation.

According to a further aspect of the present invention, a device for motion estimation and compensation comprising the device for motion estimation as defined in claim 2 is provided. The device for motion estimation and compensation further comprises a motion compensation unit adapted for compensating the motion between the area of the current image and a corresponding area of a previous image using the stored current motion vector. The stored current motion vector is substantially doubled in case that the temporal distance detection unit detected a doubling of the temporal distance between the current image and the previous image.

According to a further aspect of the present invention, a device for motion estimation and compensation comprising the device for motion estimation as defined in claim 8 is provided. The device for motion estimation and compensation further comprises a motion compensation unit adapted for compensating the motion between the area of the current image and a corresponding area of a previous image using the stored current motion vector.

According to a further aspect of the invention, an image processing device comprising the device for motion estimation and compensation as defined in claim 15 or 16 is provided. The image processing device is further adapted for temporally interpolating images and for adjusting the temporal position and the number of the temporally interpolated images in dependence of the predicted temporal distance between successive images.

Preferred embodiments of the invention are defined in the dependent claims. It shall be understood that the device for motion estimation of claim 1, the method for motion estimation of claim 13, and the computer program of claim 14, the devices for motion estimation and compensation of claims 15 and 16, and the image processing device of claim 17 have similar and/or identical preferred embodiments as defined in the dependent claims.

It shall be understood that a preferred embodiment of the invention can also be any combination of the dependent claim with the respective independent claim.

DETAILED DESCRIPTION OF THE INVENTION

The present invention is further elucidated by the following Figures and examples, which are not intended to limit the scope of the invention. The person skilled in the art will understand that various embodiments may be combined.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE DRAWINGS

In video processing, it is in many cases assumed that the temporal distance between consecutive input images is equidistant. However, in some video processing applications, this assumption is not necessarily fulfilled. A typical example of such an application is a wireless transmission of a video to a mobile device. Due to power and bandwidth constraints, the wireless transmission channel might support a frame rate of only 15 Hz, that is, the number of images transmitted to and processed by the mobile device each second is 15. When the video is derived from a movie source that was originally recorded with 24 images per second, the necessary adaptation of the frame rate might be accomplished by skipping individual movie images at the distribution side and by transmitting the remaining movie images with the desired frame rate of 15 Hz. The consequences for the input image data of the mobile device can be understood by noting that in this particular example, the temporal position of an input image in terms of the original 24 Hz movie source is incremented by 24 Hz/15 Hz=1.6 for each next image. This is also clarified by the following Table 1, wherein the upper row denotes the temporal positions of the input images of the mobile device with respect to the 24 Hz frame rate of the original movie source and wherein the lower row denotes the respective images of the original movie source that are transmitted to the mobile device, that is, the respective images of the original 24 Hz movie source that constitute the 15 Hz input image data received by the mobile device.

TABLE 1

| Pos (t) | 1.0 | 2.6 | 4.2 | 5.8 | 7.4 | 9.0 | 10.6 | 12.2 | 13.8 | 15.4 | 17.0 | 18.6 | 20.2 | ... |
|---|---|---|---|---|---|---|---|---|---|---|---|---|---|---|
| Image | 1 | 2 | 4 | 5 | 7 | 9 | 10 | 12 | 13 | 15 | 17 | 18 | 20 | ... |

In this example, the mobile device receives an input image sequence: 1, 2, 4, 5, 7, 9, 10, 12, 13, 15, 17, 18, 20, etc., that is, the images 3, 6, 8, 11, 14, 16, 19, etc. of the original movie source are skipped at the distribution side and, thus, are missing from the input image data received by the mobile device. This equates to a doubling of the temporal distance between the images pairs {2, 4}, {5, 7}, {7, 9}, {10, 12}, {13, 15}, {15, 17}, {18, 20}, etc. of the received input image sequence. When applying temporally recursive motion estimation on such an input image sequence, the algorithm will not converge satisfactorily and the resulting motion vector field will have a bad quality both in terms of reliability and accuracy. The disclosed device and method for motion estimation and compensation are adapted for handling such missing input images in video image data resulting in a higher-quality motion vector field.

Figure 1:
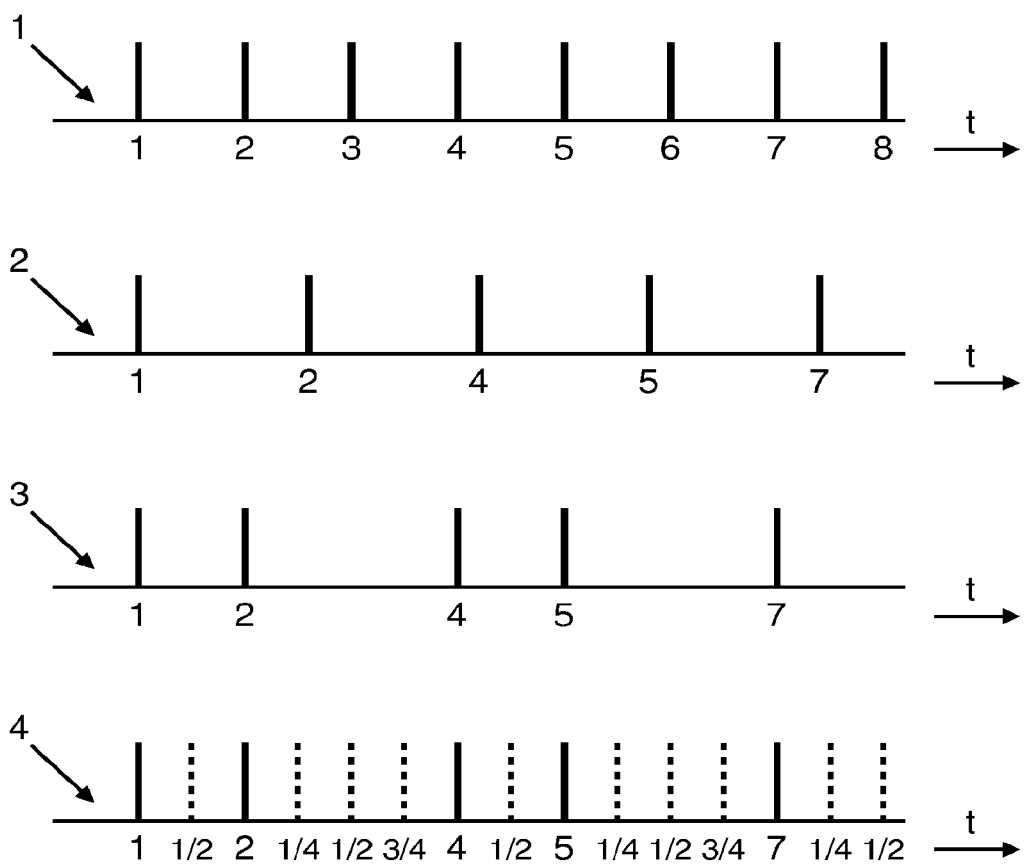
FIG. 1 shows exemplarily a timing diagram illustrating the temporal position of video images in different video image sequences.

Further advantages provided by the disclosed device and method for motion estimation, when applied in the above-described wireless video transmission scenario, shall be explained with reference to FIG. 1. The first graph 1 shows the temporal positions of the images of the original 24 Hz movie source, while the second graph 2 shows the temporal positions of the respective movie images that are transmitted to the mobile device with the desired frame rate of 15 Hz. It should be noted, that the relation between the image numbers as shown in the first graph 1 and the image numbers as shown in the second graph 2 are generally not known at the receiving side. By detecting the missing images, that is, by detecting the temporal distance between a current image and a previous image, and by keeping track of the temporal distance between successive input images, a prediction of the frame rate of the original movie source and the phase relation between the input images received by the mobile device and the original movie images may be derived. This is shown in the third graph 3, where the images of the received 15 Hz input image sequence have been placed correctly at their original 24 Hz temporal positions. The information about the temporal distance between successive input images can be used to optimally tune the motion estimation to the characteristics (in terms of missing images) of the input image data. Moreover, the fourth graph 4 shows that the information about the temporal distance between successive input images can also be used for an improved temporal interpolation. For example, for a temporal interpolation that may be applied in order to increase the frame rate of the received input image sequence from 15 Hz to 48 Hz the information about missing images can be used to properly adjust the temporal position and the number of the temporally interpolated images. In the given example, an interpolation position distance of ¼, ½, and ¾, respectively, denotes an interpolated image at a relative temporal position of ¼, ½, and ¾, respectively, between a previous and a current input image. For example, a relative temporal position of ½ between images 1 and 2 denotes an interpolated image at 1.5 (with respect to the 24 Hz frame rate of the original movie source), while a relative temporal position of ½ between images 5 and 7 denotes an interpolated image at 5.0 (with respect to the 24 Hz frame rate of the original movie source).

While the skipping of individual images of the original movie source at the distribution side has been explained with a ratio of 1.6 between the frame rate of the original movie source and the frame rate of the input image data received by the mobile device, different ratios may also occur. Moreover, while the problem of missing input images has been explained with respect to a wireless video transmission to a mobile device, this does not exclude the use of the invention in other applications and/or other devices, for example, in TV sets or in software video players running on a PC. In addition, missing input images might also be the result of processes other than the above-described frame rate adaptation, for example, individual images might be lost or corrupted during transmission via lossy distribution channels. Especially with the increasing popularity of Internet based video content, that is, video image data that is provided on the Internet for streaming or for download, and with the spread of the above-mentioned wireless video transmissions to mobile devices, the problem of missing input images due to transmission errors is becoming more and more an issue.

Figure 2:
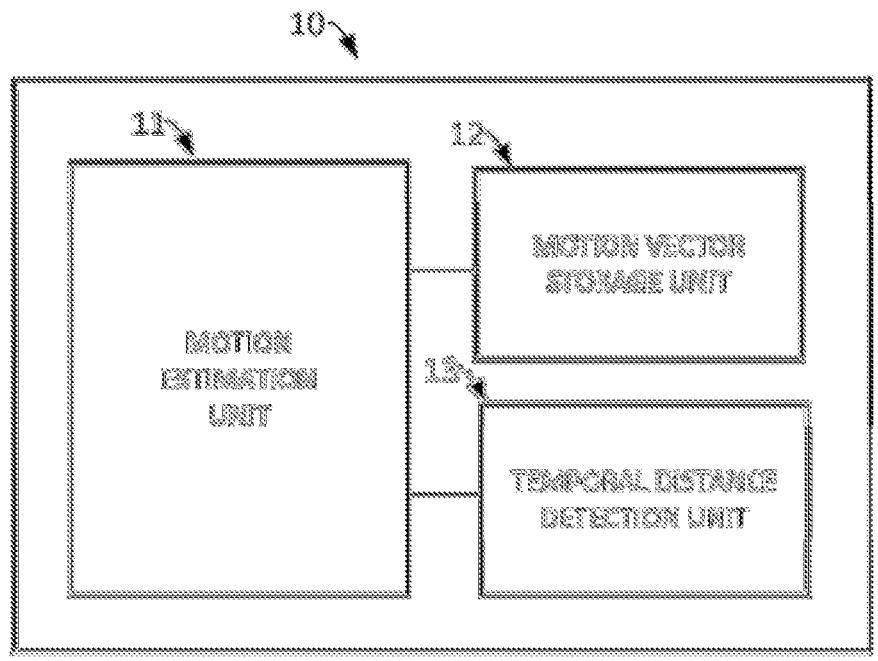
FIG. 2 shows exemplarily a block diagram of a motion estimation device according to a first embodiment of the invention.

FIG. 2 shows exemplarily a block diagram of a motion estimation device 10 for dealing with missing input images according to a first embodiment of the invention. The device for motion estimation 10 comprises a motion estimation unit 11, a motion vector storage unit 12, and a temporal distance detection unit 13. The motion estimation unit 11 is adapted for estimating a current motion vector for an area of a current image by selecting a best motion vector from a set of temporal and/or spatial candidate motion vectors as the current motion vector.

The selecting of the current motion vector may comprise calculating match errors for the respective candidate motion vectors and choosing the best motion vector from the set of temporal and/or spatial candidate motion vectors by comparing the match errors of the respective candidate motion vectors. The temporal and/or spatial candidate motion vectors are typically calculated from a limited number of previously estimated motion vectors and, optionally, additional (pseudo random) update vectors. The calculation of the match error may comprise the calculation of a block matching error, for example, a cross-correlation (CC), a sum of absolute differences (SAD), a mean-squared-error (MSE), or some comparable error measure, if the image area for which the current motion vector is estimated is a block of pixels, but it can also comprise the calculation of other error metrics for more general groups of pixels, for example, groups of pixels representing structural elements of objects within the current image. Moreover, the motion estimation does not necessarily have to be performed in the image domain, but may also be performed on a transformed version of the image.

The set of temporal and/or spatial candidate motion vectors may be determined by a set of candidate descriptors. Such descriptors describe how to construct a candidate motion vector. For example, in prior art systems, a set of temporal and/or spatial candidate motion vectors can be defined using a set of tuples {origin, location, random}, wherein possible values for "origin" are temporal (T) or spatial (S), wherein "location" denotes the relative location of a candidate motion vector with respect to the current image area, for example, when the image area for which the current motion vector is estimated is a block of pixels, a value of (1,−1) may indicate a block that is one block below and one block to the left of the current block, and wherein possible values for "random" are true (T) or false (F), indication the use of a (pseudo-random) update vector. A typical example of a set of candidate descriptors used in a prior art system would be: {S, (−1,0), F}, {S, (0,1), F}, {T, (0,0), F}, {T, (2,2), F}, {S, (−1,0), T}, {S, (0,1), T}.

According to the invention, the motion estimation unit 11 is further adapted for substantially doubling one or more of the candidate motion vectors and for including the one or more substantially doubled candidate motion vectors in the set of candidate motion vectors.

In this embodiment, the including of the one or more substantially doubled candidate motion vectors in the set of candidate motion vectors may be implemented by a set of candidate descriptors of the form {origin, location, random, modifier}, wherein possible values of the additional "modifier" are regular (R) or double (D), indicating a regular candidate motion vector or a substantially doubled candidate motion vector. An example of a set of candidate descriptors that includes an additional substantially doubled candidate motion vector in the set of candidate motion vectors would be: {S, (−1,0), F, R}, {S, (0,1), F, R}, {T, (0,0), F, R}, {T, (2,2), F, R}, {S, (−1,0), T, R}, {S, (0,1), T, R}, {S, (0,1), F, D}. However, it would also be possible to include one or more substantially doubled candidate motion vectors instead of regular candidate motion vectors in order to not increase the computational effort required for the motion estimation.

The motion vector storage unit 12 is adapted for storing the current motion vector. In case that one of the one or more substantially doubled candidate motion vectors is selected as the current motion vector, the motion estimation unit 11 nonetheless stores the associated regular candidate motion vector as the current motion vector in the motion vector storage unit 12. The stored current motion vector is typically used for motion compensation as well as for calculating a temporal candidate motion vector for an image area in the neighborhood of the current image area in a subsequent image and/or for calculating a spatial candidate motion vector for a different image area in the current image.

The temporal distance detection unit 13 is adapted for detecting a doubling of the temporal distance between the current image and the previous image. In this embodiment, the temporal distance detection unit 13 is adapted for detecting a doubling of the temporal distance between the current image and the previous image by analyzing the number of substantially doubled candidate motion vectors that are selected as the current motion vector for respective areas of the current image. In other embodiments, however, other heuristics/methods for detecting a doubling of the temporal distance between the current image and the previous image may be used.

In this embodiment, the temporal distance detection unit is further adapted for keeping track of the temporal distance between successive images and for deriving a prediction of the temporal distance between the current image and the previous image. In other embodiments, however, the temporal distance detection unit 13 does not have to be adapted in such a way.

If the temporal distance detection unit 13 is adapted for keeping track of the temporal distance between successive images and for deriving a prediction of the temporal distance between the current image and the previous image, it is preferred that the motion estimation unit 11 is adapted for including the one or more substantially doubled candidate motion vectors in the set of candidate motion vectors in dependence of the predicted temporal distance between the current image and the previous image. For example, in this embodiment, the motion estimation unit 11 is adapted for including the one or more substantially doubled candidate motion vectors in the set of candidate motion vectors only if a doubling of the temporal distance between the current image and the previous image is predicted with a high probability.

In case that a doubling of the temporal distance between the current image and the previous image is predicted with a very high probability, it may be advantageous to sacrifice some regular candidate motion vectors for a larger number of substantially doubled motion vectors. For example, a set of candidate descriptors that includes an larger number of substantially doubled candidate motion vectors in the set of candidate motion vectors could be: {S, (−1,0), F, D}, {S, (0,1), F, R}, {T, (0,0), F, D}, {T, (2,2), F, R}, {S, (−1,0), T, D}, {S, (0,1), T, R}, {S, (0,1), F, D}. In general, an optimal set of candidate motion vectors may be selected based on thresholds settings adapted to the temporal distance prediction probability.

In addition, a further optimization can be achieved by avoiding to calculate the match error for a certain candidate vector more than once (coincidentally, a substantially doubled candidate motion vector may be equal to one of the regular candidate motion vectors).

Figure 3:
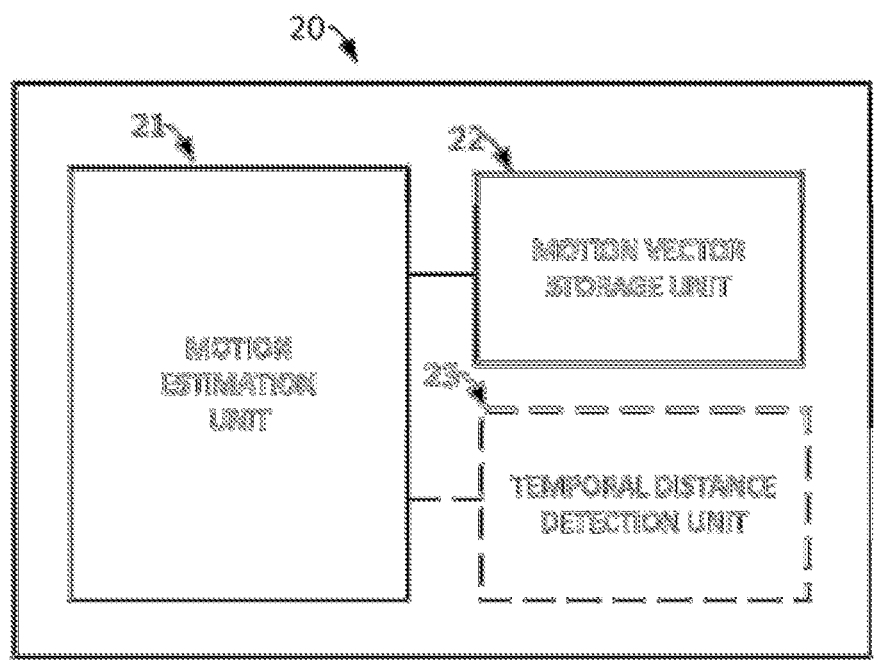
FIG. 3 shows exemplarily a block diagram of a motion estimation device according to a second embodiment of the invention.

FIG. 3 shows exemplarily a block diagram of a motion estimation device 20 for dealing with missing input images according to a second embodiment of the invention. The device for motion estimation 20 comprises a motion estimation unit 21, a motion vector storage unit 22, and, optionally, a temporal distance detection unit 23. The motion estimation unit 21 is adapted for estimating a current motion vector for an area of a current image by selecting a best motion vector from a set of temporal and/or spatial candidate motion vectors as the current motion vector.

The selecting of the current motion vector may comprise calculating match errors for the respective candidate motion vectors and choosing the current motion vector from the set of temporal and/or spatial candidate motion vectors by comparing the match errors of the respective candidate motion vectors. The temporal and/or spatial candidate motion vectors are typically calculated from a limited number of previously estimated motion vectors and, optionally, additional (pseudo random) update vectors. The calculation of the match error may comprise the calculation of a block matching error, for example, a cross-correlation (CC), a sum of absolute differences (SAD), a mean-squared-error (MSE), or some comparable error measure, if the image area for which the current motion vector is estimated is a block of pixels, but it can also comprise the calculation of other error metrics for more general groups of pixels, for example, groups of pixels representing structural elements of objects within the current image.

According to the invention, the motion estimation unit 21 is further adapted for substantially doubling one or more of the candidate motion vectors and for including the one or more substantially doubled candidate motion vectors in the set of candidate motion vectors. The motion estimation unit 21 is further adapted for substantially halving one or more candidate motion vectors and for including the one or more substantially halved candidate motion vectors in the set of candidate motion vectors.

In this embodiment, the including of the one or more substantially doubled or halved candidate motion vectors in the set of candidate motion vectors may be implemented by a set of candidate descriptors of the form {origin, location, random, modifier}, wherein possible values of the additional "modifier" are regular (R), double (D) or half (H), indicating a regular candidate motion vector, a substantially doubled candidate motion vector, or a substantially halved candidate motion vector. An example of a set of candidate descriptors that includes an additional substantially doubled candidate motion vector and an additional substantially halved candidate motion vector in the set of candidate motion vectors would be: {S, (−1,0), F, R}, {S, (0,1), F, R}, {T, (0,0), F, R}, {T, (2,2), F, R}, {S, (−1,0), T, R}, {S, (0,1), T, R}, {S, (0,1), F, D}, {S, (0,1), F, H}. However, it would also be possible to include one or more substantially doubled or halved candidate motion vector instead of regular candidate motion vectors in order to not increase the computational effort required for the motion estimation.

The motion vector storage unit 22 is adapted for storing the current motion vector. In case that one of the one or more substantially doubled or halved candidate motion vectors is selected as the current motion vector, the motion estimation unit 21 stores the substantially doubled or halved candidate motion vector as the current motion vector in the motion vector storage unit. The stored current motion vector is typically used for motion compensation as well as for calculating a temporal candidate motion vector for an image area in the neighborhood of the current image area in a subsequent image and/or for calculating a spatial candidate motion vector for a different image area in the current image.

The optional temporal distance detection unit 23 is adapted for detecting a doubling or halving of the temporal distance between the current image and the previous image. In this embodiment, the optional temporal distance detection unit 23 is adapted for detecting a doubling or halving of the temporal distance between the current image and the previous image (relative to the temporal distance between the previous image pair) by comparing the lengths of current motion vectors for respective areas of the current image with the lengths of previous motion vectors for related areas of the previous image. Herein, the term "related area" may relate to the same location in the previous image or, alternatively, may relate to a location in the previous image that is shifted by the current motion vector with respect to a respective area of the current image. In other embodiments, however, other heuristics/methods for detecting a doubling or halving of the temporal distance between the current image and the previous image may be used.

In this embodiment, the temporal distance detection unit 23 is further adapted for keeping track of the temporal distance between successive images and for deriving a prediction of the temporal distance between the current image and the previous image. In other embodiments, however, the temporal distance detection unit 23 does not have to be adapted in such a way.

If the temporal distance detection unit 23 is adapted for keeping track of the temporal distance between successive images and for deriving a prediction of the temporal distance between the current image and the previous image, it is preferred that the motion estimation unit 21 is adapted for including the one or more substantially doubled or halved candidate motion vectors in the set of candidate motion vectors in dependence of the predicted temporal distance between the current image and the previous image. For example, in this embodiment, the motion estimation unit 21 is adapted for including the one or more substantially doubled candidate motion vectors in the set of candidate motion vectors only if a doubling of the temporal distance between the current image and the previous image (relative to the temporal distance between the previous image pair) is predicted with a high probability and for including the one or more substantially halved candidate motion vectors in the set of candidate motion vectors only if a halving of the temporal distance between the current image and the previous image (relative to the temporal distance between the previous image pair) is predicted with a high probability.

In case that a doubling or halving of the temporal distance between the current image and the previous image is predicted with a very high probability, it may be advantageous to sacrifice some regular candidate motion vectors for a larger number of substantially doubled or halved motion vectors. For example, a set of candidate descriptors that includes an larger number of substantially doubled candidate motion vectors in the set of candidate motion vectors could be: {S, (−1,0), F, D}, {S, (0,1), F, R}, {T, (0,0), F, D}, {T, (2,2), F, R}, {S, (−1,0), T, D}, {S, (0,1), T, R}, {S, (0,1), F, D}. Likewise, a set of candidate descriptors that includes an larger number of substantially halved candidate motion vectors in the set of candidate motion vectors could be: {S, (−1,0), F, H}, {S, (0,1), F, R}, {T, (0,0), F, H}, {T, (2,2), F, R}, {S, (−1,0), T, H}, {S, (0,1), T, R}, {S, (0,1), F, H}. In general, an optimal set of candidate motion vectors may be selected based on thresholds settings adapted to the temporal distance prediction probability.

In addition, a further optimization can be achieved by avoiding to calculate the match error for a certain candidate motion vector more than once (coincidentally, a substantially doubled or halved candidate motion vector may be equal to one of the regular candidate motion vectors or to one of the other substantially doubled or halved candidate motion vectors).

Figure 4:
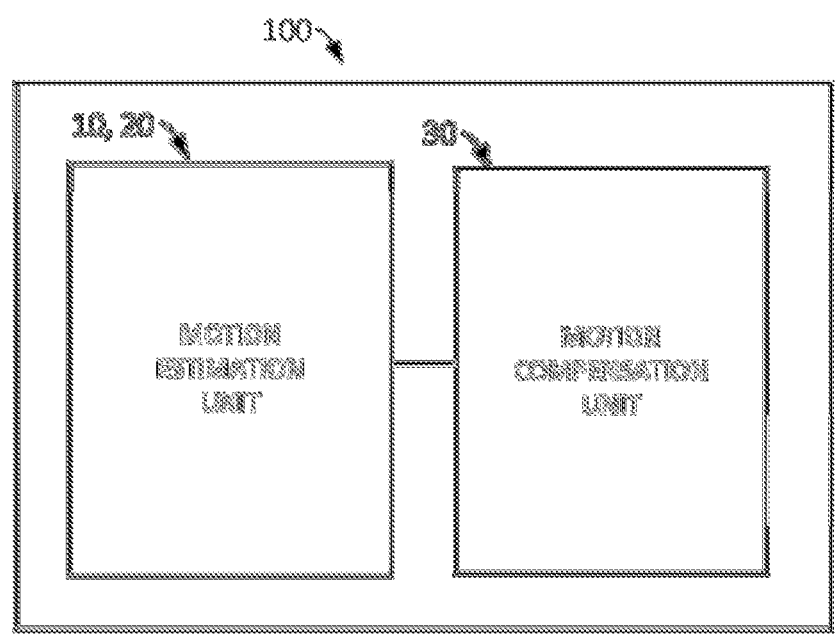
FIG. 4 shows exemplarily a block diagram of a motion estimation and compensation device according to a third embodiment of the invention.

FIG. 4 shows exemplarily a block diagram of a motion estimation and compensation device 100 for dealing with missing input images according to a third embodiment of the invention. The device for motion estimation and compensation 100 comprises the device for motion estimation according to any of the above-described embodiments of the invention. The device for motion estimation and compensation 100 further comprises a motion compensation unit 30 adapted for compensating the motion between the group of pixels of the current image and a corresponding group of pixels of a previous image using the stored current motion vector.

In another embodiment, the motion compensation unit 30 is further adapted for doubling the length of the stored current motion vector in case that the temporal distance detection unit 13 detected a doubling of the temporal distance between the current image and the previous image.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single device or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A system for motion estimation, comprising:
a memory for storing a plurality of candidate motion vectors associated with a temporal distance; and
a processor operable to:
detect of the current temporal distance between the current image and the previous image according to a temporal distance history;
estimate a current motion vector and a current temporal distance according to a current image and a previous image;
increase the magnitude of a candidate motion vector in the plurality candidate motion vectors by a scale factor to produce a scaled candidate motion vector, the scale factor being a non-integer determined according a comparison between the temporal distance and the estimated current temporal distance;
select an updated motion vector according to a match error between the scaled candidate motion vector and the estimated current motion vector; and
decrease the magnitude of the updated motion vector by the scale factor, and store the updated motion vector with a decreased magnitude as a candidate motion vector in the plurality of candidate motion vectors.

2. The system of claim 1, wherein the temporal distance detection unit is operable to analyze a number of scaled candidate motion vectors that are selected as the updated motion vector for a respective area of the current image.

3. The system of claim 1, wherein the motion estimation unit is operable to select the scaled candidate motion vector as the updated motion vector according to the estimated current temporal distance.

4. The system of claim 1, wherein the temporal distance detection unit is operable to estimate the current temporal distance according to a comparison of a length of the current motion vector for a respective area of the current image with one or more lengths of previous motion vectors for related areas of the previous image.

5. The system of claim 4, wherein the motion estimation unit is operable to select the scaled candidate motion vector as the updated motion vector according to the estimated current temporal distance.

6. The system of claim 1, wherein the processor comprises a motion compensation unit operable to compensate for motion between an area of the current image and a corresponding area of the previous image using the scaled candidate motion vector according to the temporal distance.

7. The system of claim 1, wherein the temporal distance corresponds to a missing image between the current image and the previous image.

8. The system of claim 1, wherein the scale factor is between 1.7 and 2.

9. A method for motion estimation, the method comprising:
storing a plurality of candidate motion vectors associated with a temporal distance;
detecting the current temporal distance between the current image and the previous image according to a temporal distance history;
estimating a current motion vector and a current temporal distance according to a current image and a previous image;
increasing the magnitude of a candidate motion vector in the plurality of candidate motion vectors by a scale factor to produce a scaled candidate motion vector, the scale factor being a non-integer determined according a comparison between the temporal distance and the estimated current temporal distance;
selecting an updated motion vector according to a match error between the scaled candidate motion vector and the estimated current motion vector; and
decreasing the magnitude of the updated motion vector by the scale factor; and storing the updated motion vector with a decreased magnitude as a candidate motion vector in the plurality of candidate motion vectors.

10. The method of claim 9, wherein the method comprises detecting whether one or more images between the current image and the previous image are missing.

11. The method of claim 9, wherein estimating the current temporal distance comprises analyzing a number of scaled candidate motion vectors that are selected as the updated motion vector for a respective area of the current image.

12. The method of claim 9, wherein selecting the updated motion vector comprises selecting the scaled candidate motion vector as the updated motion vector according to the estimated current temporal distance.

13. The method of claim 9, wherein the method comprises estimating the current temporal distance according to a comparison of a length of the current motion vector for a respective area of the current image with one or more lengths of previous motion vectors for related areas of the previous image.

14. The method of claim 9, wherein the method comprises compensating for motion between an area of the current image and a corresponding area of the previous image using the scaled candidate motion vector according to the temporal distance.

15. The method of claim 9, wherein the temporal distance corresponds to a missing image between the current image and the previous image.

16. The method of claim 2, wherein the scale factor is between 1.7 and 2.

17. A computer program stored on a non-transitory, computer-readable memory device, that when executed by a processor, the computer program enabling a method comprising:
storing a plurality of candidate motion vectors associated with a temporal distance;
detecting the current temporal distance between the current image and the previous image according to a temporal distance history;
estimating a current motion vector and a current temporal distance according to a current image and a previous image;
increasing the magnitude of a candidate motion vector in the plurality of candidate motion vectors by a scale factor to produce a scaled candidate motion vector, the scale factor being a non-integer determined according a comparison between the temporal distance and the estimated current temporal distance;
selecting an updated motion vector according to a match error between the scaled candidate motion vector and the estimated current motion vector; and
decreasing the magnitude of the updated motion vector by the scale factor; and storing the updated motion vector with a decreased magnitude as a candidate motion vector in the plurality of candidate motion vectors.

* * * * *